(12) United States Patent
Maya et al.

(10) Patent No.: US 11,989,014 B2
(45) Date of Patent: May 21, 2024

(54) STATE ESTIMATION APPARATUS, METHOD, AND NON-TRANSITORY COMPUTER READABLE MEDIUM

(71) Applicants: KABUSHIKI KAISHA TOSHIBA, Tokyo (JP); TOSHIBA INFRASTRUCTURE SYSTEMS & SOLUTIONS CORPORATION, Kanagawa (JP)

(72) Inventors: Shigeru Maya, Yokohama (JP); Ken Ueno, Tachikawa (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 79 days.

(21) Appl. No.: 17/012,671

(22) Filed: Sep. 4, 2020

(65) Prior Publication Data
US 2021/0183528 A1 Jun. 17, 2021

(30) Foreign Application Priority Data
Dec. 17, 2019 (JP) ................................. 2019-227675

(51) Int. Cl.
*G05B 23/02* (2006.01)
*G16Y 20/20* (2020.01)
(Continued)

(52) U.S. Cl.
CPC ............ *G05B 23/024* (2013.01); *G16Y 20/20* (2020.01); *G16Y 40/10* (2020.01); *G16Y 40/20* (2020.01); *G16Y 40/40* (2020.01)

(58) Field of Classification Search
None
See application file for complete search history.

(56) References Cited

U.S. PATENT DOCUMENTS

| 2008/0010330 A1* | 1/2008 | Ide ........................ G05B 23/024 708/201 |
| 2009/0030753 A1* | 1/2009 | Senturk-Doganaksoy .................. G05B 23/0221 705/7.38 |

(Continued)

FOREIGN PATENT DOCUMENTS

| JP | 2007-72854 A | 3/2007 |
| JP | 2007-141208 A | 6/2007 |

(Continued)

*Primary Examiner* — Chris Parry
*Assistant Examiner* — Abderrahmen Chouat
(74) *Attorney, Agent, or Firm* — Oblon, McClelland, Maier & Neustadt, L.L.P.

(57) ABSTRACT

One embodiment of the present invention provides an information processing apparatus for precisely estimating a state of equipment. An information processing apparatus as one embodiment of the present invention includes: an acquirer; a calculator; and a determiner. The acquirer is configured to acquire first data about a predetermined target. The calculator is configured to calculate distribution of magnitude of a value included in the first data. The determiner is configured to determine a portion of a width of the distribution as a specific range used for estimating a state of the target based on the distribution.

13 Claims, 9 Drawing Sheets

(51) Int. Cl.
*G16Y 40/10* (2020.01)
*G16Y 40/20* (2020.01)
*G16Y 40/40* (2020.01)

(56) References Cited

U.S. PATENT DOCUMENTS

| | | | |
|---|---|---|---|
| 2012/0180103 A1* | 7/2012 | Weik, III | G06Q 10/00 |
| | | | 726/1 |
| 2015/0160098 A1* | 6/2015 | Noda | G01M 99/00 |
| | | | 702/35 |
| 2016/0169771 A1* | 6/2016 | Hiruta | G05B 23/0243 |
| | | | 702/183 |
| 2016/0378585 A1* | 12/2016 | McElhinney | G05B 23/0275 |
| | | | 714/37 |
| 2018/0225166 A1* | 8/2018 | Maya | G06N 20/00 |
| 2018/0373234 A1* | 12/2018 | Khalate | G05B 23/0229 |
| 2019/0050515 A1* | 2/2019 | Su | G01R 31/007 |
| 2019/0188584 A1* | 6/2019 | Rao | G05B 19/4184 |
| 2020/0081445 A1* | 3/2020 | Stetson | G06N 5/02 |
| 2020/0167640 A1* | 5/2020 | Sundareswara | G06N 3/08 |
| 2020/0371858 A1* | 11/2020 | Hayakawa | G06F 11/0778 |
| 2020/0409514 A1* | 12/2020 | Naganuma | H04N 1/00323 |
| 2021/0042205 A1* | 2/2021 | Hashimoto | G06F 3/1423 |
| 2021/0293666 A1* | 9/2021 | Rizvi | G01M 99/005 |
| 2021/0373542 A1* | 12/2021 | Natsumeda | G06N 5/022 |

FOREIGN PATENT DOCUMENTS

| | | | |
|---|---|---|---|
| JP | 2019-32671 A | | 2/2019 |
| KR | 20170125265 | * | 5/2016 |

* cited by examiner

| MONITORING VALUE (CONVEYANCE TIME [ms]) | RECORDING DATE AND TIME |
|---|---|
| 1.2 | 4/5 09:02 |
| 2.3 | 4/5 11:30 |
| 3.2 | 4/5 14:23 |
| 2.4 | 4/6 08:23 |
| 5.3 | 4/6 09:34 |
| ... | ... |
| ... | ... |
| ... | ... |

FIG. 3

STATE ESTIMATION APPARATUS, METHOD, AND NON-TRANSITORY COMPUTER READABLE MEDIUM

CROSS-REFERENCE TO RELATED APPLICATION (S)

This application is based upon and claims the benefit of priority from Japanese Patent Application No. 2019-227675, filed Dec. 17, 2019; the entire contents of which are incorporated herein by reference.

FIELD

An embodiment relates to an information processing apparatus, an information processing method, and a non-transitory computer readable medium.

BACKGROUND

Accompanying progress of Internet of things (IoT), various data about various events have been acquired. One of utilization method of such data is enhancement of efficiency in maintenance work. For example, when equipment used as so-called "social infrastructures" such as an automatic ticket gate, a mail sorter, and a bill validator has trouble, a maintenance person has to rush to a site. Thus, if a measure may in advance be taken by estimating that such equipment is in a state of being likely to have trouble, unexpected troubleshooting does not have to be performed, and a load on the maintenance person, dissatisfaction of a user, and so forth may be reduced. Thus, a procedure for precisely estimating a state of equipment has been demanded.

BRIEF DESCRIPTION OF THE DRAWINGS

FIG. 3 is a diagram illustrating one example of monitoring data;

DETAILED DESCRIPTION

One embodiment of the present invention provides an information processing apparatus for precisely estimating a state of equipment.

An information processing apparatus as one embodiment of the present invention includes: an acquirer; a calculator; and a determiner. The acquirer is configured to acquire first data about a predetermined target. The calculator is configured to calculate distribution of magnitude of a value included in the first data. The determiner is configured to determine a portion of a width of the distribution as a specific range used for estimating a state of the target based on the distribution.

An embodiment will be explained in detail below with reference to the accompanying drawings. The present invention is not limited to the embodiment.

One Embodiment of the Present Invention

Figure 1:
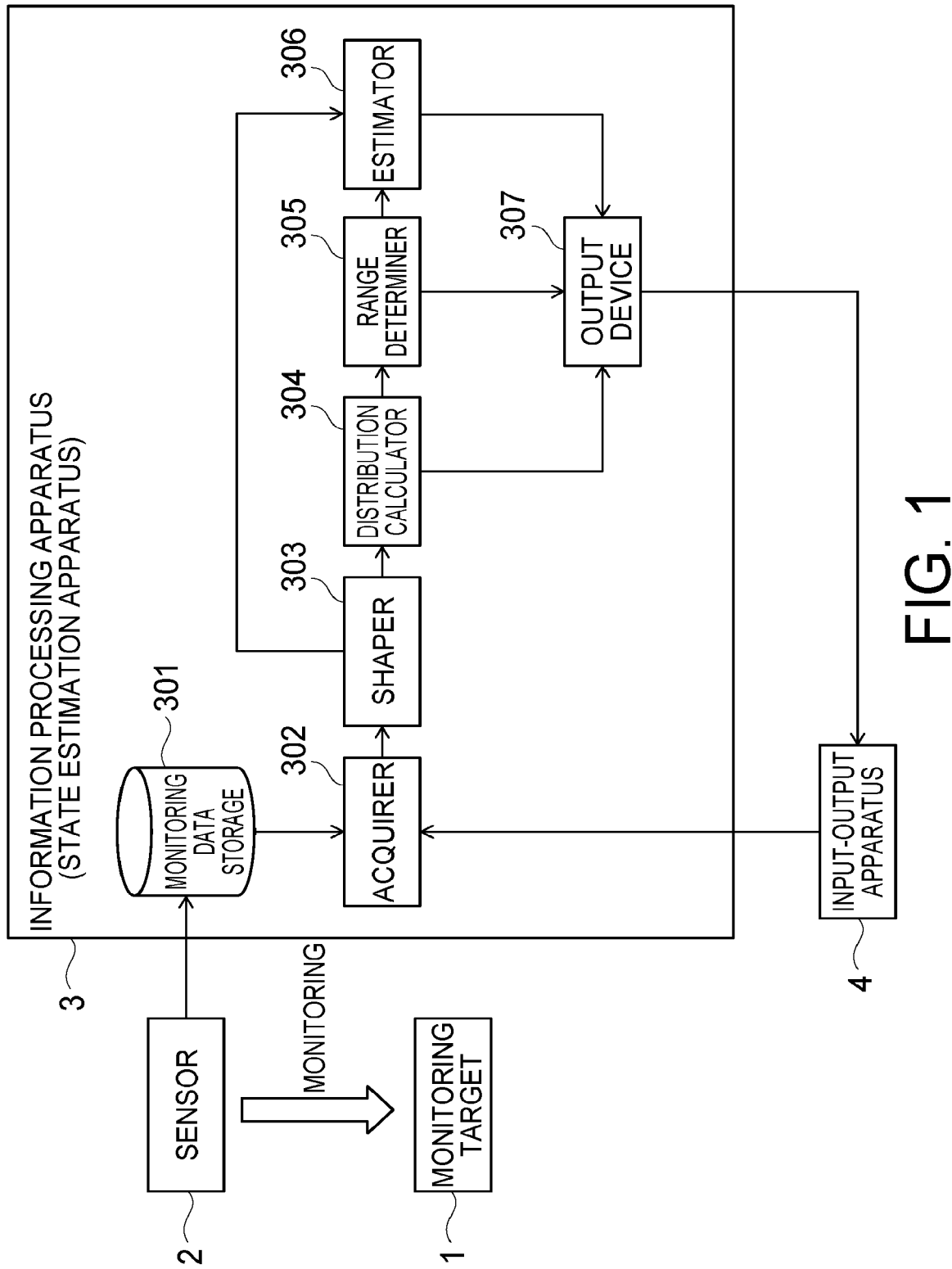
FIG. 1 is a block diagram illustrating one example of a state estimation system according to a first embodiment.

FIG. 1 is a block diagram illustrating one example of a state estimation system according to a first embodiment. The state estimation system related to this embodiment includes a monitoring target 1, a sensor 2, an information processing apparatus (state estimation apparatus) 3, and an input-output apparatus 4. The information processing apparatus 3 includes a monitoring data storage 301, an acquirer 302, a shaper 303, a distribution calculator 304, a range determiner 305, an estimator 306, and an output device 307.

The state estimation system is a system estimating a state of the monitoring target 1. The monitoring target is not particularly limited but may be equipment from which high reliability is demanded such as a power plant, a railroad, an automatic ticket gate, a mail sorter, and a bill validator. Equipment from which high reliability is demanded hardly becomes an abnormal state. Thus, it is difficult for an apparatus that estimates abnormality based on data in an abnormal state to precisely perform state estimation about such equipment. However, in this embodiment, estimation is performed by using data of the monitoring target 1 in a normal state such as data about processing time of the monitoring target 1, for example. Thus, the state estimation may precisely be performed for such equipment.

However, in a case where the state estimation is performed by using the data in the normal state, the precision of the state estimation is lowered due to deviation of the value indicated by the data. In particular, in the equipment from which high reliability is demanded, a delay of processing or reprocessing due to failure of processing is not likely to occur, and the distribution of values of data is likely to be deviated. That is, almost the same value is indicated in most data, and when the state estimation is attempted by using an average value or the like, a peculiar value remains unknown. Thus, when the state estimation is performed based on the average value or the like of all data, precision is not improved. Further, because the value of data varies while being influenced by various factors, when the range of the value of data is in advance defined, the precision of estimation may be lowered. Accordingly, in this embodiment, a range of data preferentially used in the data used for estimation is determined, and estimation is performed mainly based on the data included in the range. Details will be described together with an internal configuration of the information processing apparatus 3.

The sensor 2 measures the value of a predetermined monitoring item of the monitoring target 1. The monitoring item is not particularly limited as long as the monitoring item is expected to be influenced by the state of the monitoring target 1 and is measurable by a known sensor. Note that plural sensors 2 may be provided, and the monitoring item may be obtained from measurement values by the plural sensors 2. That is, a computed value based on the measurement values by the plural sensors 2 may be the value of the monitoring item. In the following, the value of the monitoring item will be denoted as "monitoring value", and data about the monitoring value will be denoted as "monitoring data (first data)". That is, this state estimation system collects the monitoring data about a predetermined target by using the sensor 2. Note that one or plural monitoring items may be provided. Further, the sensor 2 may be built in the monitoring target 1 or may be installed on the outside of the monitoring target 1.

Figure 2:
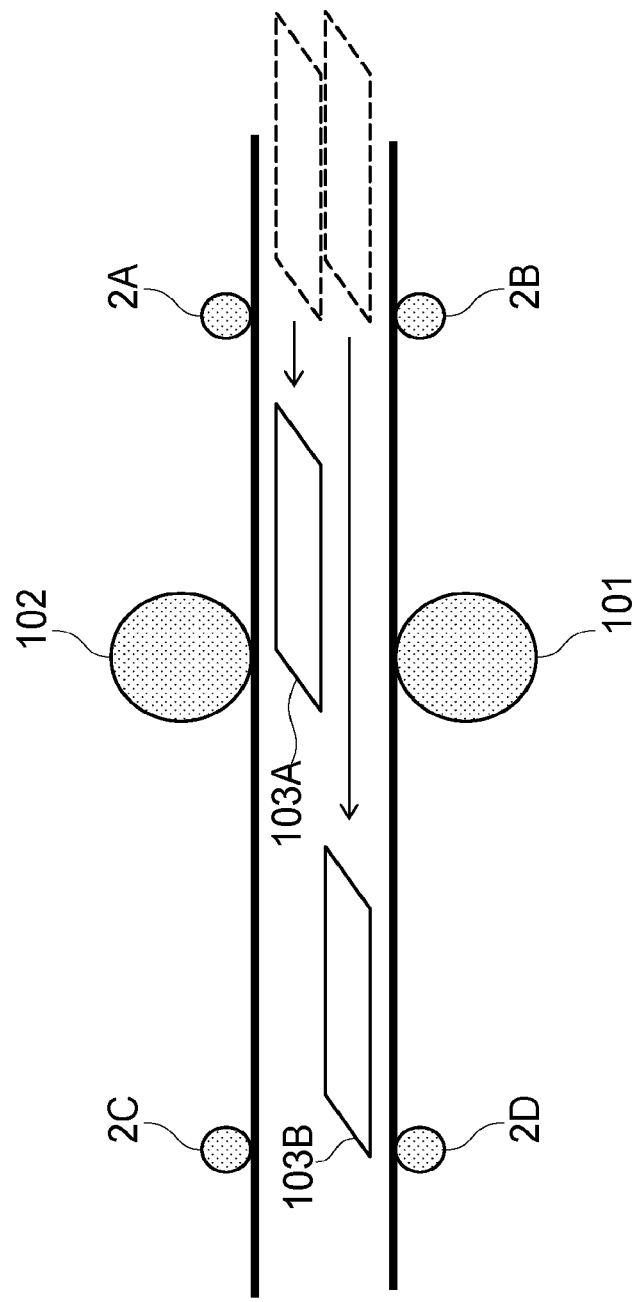
FIG. 2 is a diagram illustrating one example of measurement by a sensor.

FIG. 2 is a diagram illustrating one example of measurement by a sensor. In the example of FIG. 2, the monitoring target 1 is an automatic ticket gate, and plural sensors 2A to 2D are built in the automatic ticket gate. Further, it is assumed that conveyance time of a ticket conveyed in the automatic ticket gate is the monitoring item.

In the example of FIG. 2, two superimposed tickets 103A and 103B are simultaneously fed into the automatic ticket gate. Two rectangles illustrated by dotted lines on the right side of FIG. 2 indicate the tickets 103A and 103B immediately after feeding. The tickets 103A and 103B are conveyed to a left side by a feed roller 101 as indicated by arrows in FIG. 2. However, the upper ticket 103A is stopped by a separation roller 102. Thus, the ticket 103A is indicated below the separation roller 102. The ticket 103A is again conveyed to the left side by the feed roller 101 after the stop. Meanwhile, the lower ticket 103B is conveyed to the left side without being stopped by the separation roller 102. Thus, the ticket 103B is indicated on the left side of the separation roller 102.

The sensors 2A and 2C detect that the ticket 103A arrives at the respective installation positions and measure the time points of the arrival. The conveyance time of the ticket 103A becomes known from the difference between the measured time points. In the same manner, the sensors 2B and 2D detect that the ticket 103B arrives at the respective installation positions and measure the time points of the arrival. Accordingly, the conveyance time of the ticket 103B becomes known. As described above, the values of plural monitoring items may be obtained based on measurement results by the plural sensors 2.

The conveyance time of the ticket, in other words, the processing time of the automatic ticket gate tends to gradually extend due to adhesion of trash and degradation of the feed roller 101 and so forth over time. In other words, the processing time of the automatic ticket gate becomes long in accordance with deterioration of the state of the automatic ticket gate. Besides, the conveyance time depends on the state of a fed ticket. For example, in a case where the ticket is deformed and has many wrinkles, the conveyance time is likely to become longer than a case where the ticket is not in such a state. Further, the conveyance time is also influenced by a surrounding environment and so forth. For example, because two tickets are easily separated in the summer with high humidity, the processing time becomes shorter than the winter with low humidity. That is, the value of the processing time fluctuates due to influences by various events. Thus, in a case where standard time related to processing is in advance defined and it is hastily assessed that the state of the monitoring target 1 is deteriorated because the processing time is longer than the standard time, estimation precision becomes low.

The information processing apparatus 3 performs processing for the monitoring data and then estimates the state of the monitoring target 1 based on the processing result. Thus, the information processing apparatus 3 may also be considered to be a state estimation apparatus. Specifically, the information processing apparatus 3 determines a portion preferentially used for state estimation in the monitoring data, in other words, a range. Accordingly, even if the above-described equipment from which high reliability is demanded is the monitoring target 1, estimation may highly precisely be performed based on the data in the normal state. Further, the range is not fixed and is determined based on the monitoring data at each state estimation. Accordingly, the precision of estimation is prevented from being lowered due to a change in an environment or the like. Details will be described together with an internal configuration of the information processing apparatus 3.

The input-output apparatus 4 inputs data needed by the information processing apparatus 3 other than the monitoring data obtained by the sensor 2 to the information processing apparatus 3 and outputs an estimation result or the like from the information processing apparatus 3. For example, a condition in a case where each configuration element of the information processing apparatus 3 performs processing, for example, a threshold value or the like related to estimation may be designated through the input-output apparatus 4.

Note that each apparatus and each configuration element of the information processing apparatus 3 that are illustrated in FIG. 1 may be subdivided or integrated. Further, the state estimation system and the information processing apparatus 3 may have a configuration element not illustrated in FIG. 1. For example, the information processing apparatus 3 may be split into an apparatus including the distribution calculator 304, the range determiner 305, and so forth and determining the range of the monitoring data used for the state estimation and an apparatus including the estimator 306 and so forth and estimating the state. Further, the shaper 303 may be split into a first shaper excluding an outlier and a second shaper performing smoothing. Such division into apparatuses performing respective kinds of processing in a specialized manner is often made in an information processing system in order to disperse a processing load, maintain availability, and so forth. Further, for example, the state estimation system may have a storage such as a network area storage, and the storage may store the monitoring data. That is, the monitoring data storage 301 may be present on the outside of the information processing apparatus 3. Further, for example, the input-output apparatus 4 may be split into an input apparatus and an output apparatus.

The internal configuration of the information processing apparatus 3 will be described. The monitoring data storage 301 stores the monitoring data. Note that an acquisition source of the monitoring data is not particularly limited. The monitoring data may directly be acquired from the sensor 2 or may be acquired via the monitoring target 1 collecting the monitoring data from the sensor 2, another apparatus, or the like.

FIG. 3 is a diagram illustrating one example of the monitoring data. In the example of FIG. 3, the conveyance time as the monitoring value and date and time related to the conveyance time are indicated. Note that the monitoring item is not limited to the example of FIG. 3, plural monitoring items may be present as described above. That is, the monitoring data may be univariate data or may be multivariate data. For example, as the above-described example of FIG. 2, the respective conveyance times of two tickets may be included as the monitoring values in the monitoring data.

The acquirer 302 acquires the monitoring data in a time period related to the present estimation from the monitoring data stored in the monitoring data storage 301. For example, the time period is designated via the input-output apparatus 4, and the monitoring data in the designated time period may thereby be acquired. Alternatively, the time period related to estimation such as one hour or one day may be defined in advance in accordance with the monitoring item, and the monitoring data in a concerned time period may be acquired with the present date and time as a reference. The acquired monitoring data is used for determination of a range of the monitoring value preferentially used for at least present estimation. This range will be denoted as "interested range". The interested range will be described later.

Further, in a case where the state estimation is performed, the acquirer 302 may acquire the monitoring data having the monitoring value in the determined interested range in the monitoring data in the time period related to the present estimation. A case is possible where the present estimation is performed by using the acquired monitoring data.

The shaper 303 shapes the monitoring data acquired by the acquirer 302. For example, an outlier included in the acquired monitoring data may be removed. Further, because noise is considered to be included in the monitoring data, noise may be removed by a smoothing procedure such as a moving average.

The distribution calculator 304 calculates the distribution of the magnitude of the monitoring value based on the monitoring data in the time period related to the present estimation. For example, a histogram may be created by counting the number of monitoring values included in each of plural unit intervals (bins). Settings of the histogram, for example, the number of bins and width may be defined in advance in accordance with the monitoring item. Alternatively, the distribution calculator 304 may determine the settings of the histogram based on a distribution range or the like of data by using square-root choice, Sturges' formula, or the like.

Note that the distribution calculator 304 may create distribution of the monitoring value throughout the whole time period related to the present estimation or may divide the time period related to the present estimation into each designated unit time period and create distribution for each unit time period. For example, in a case where the time period related to the present estimation spans several days, distribution may be created for each day. The unit time period may be defined in advance or may be designated through the input-output apparatus 4.

Figure 4:
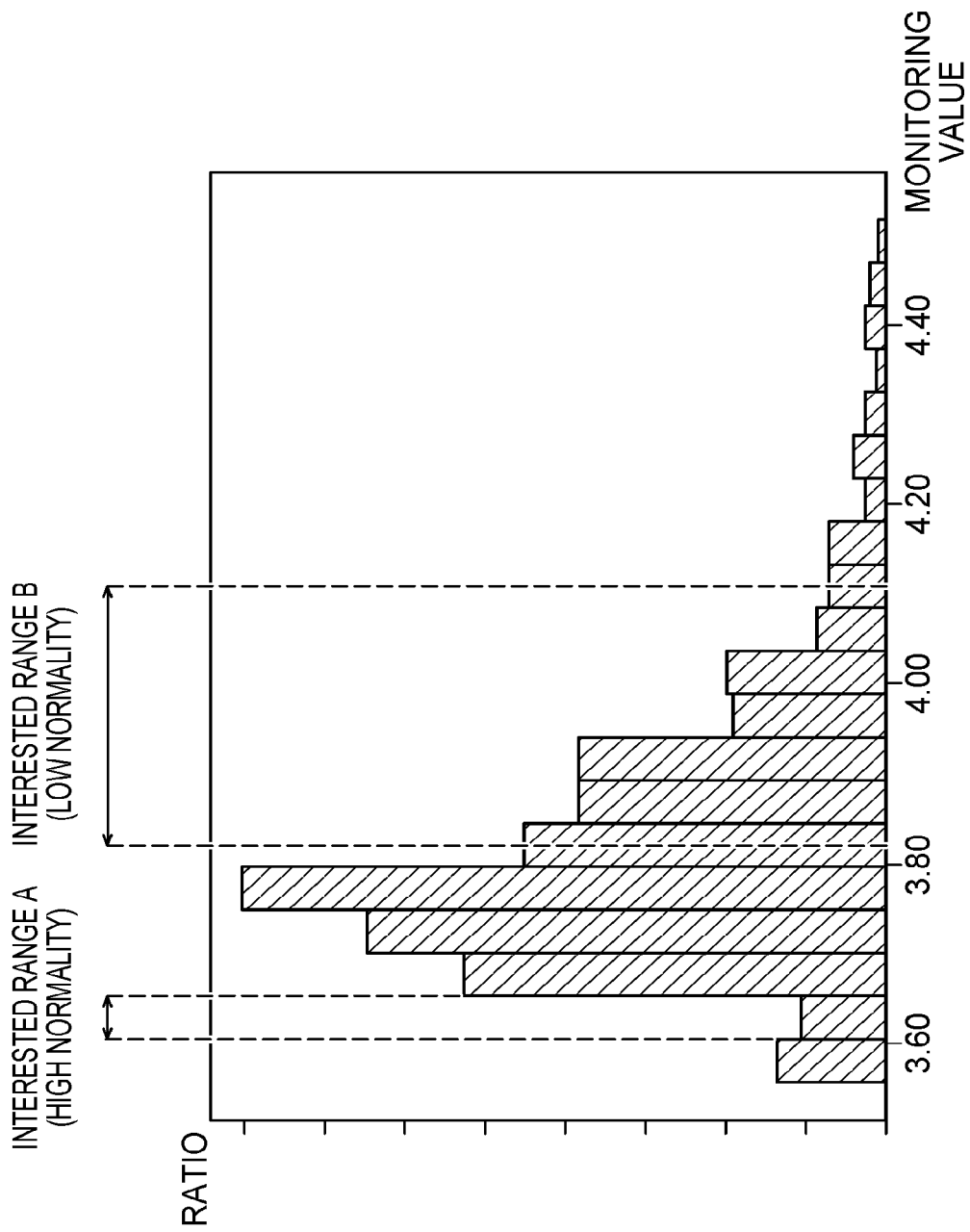
FIG. 4 is a diagram illustrating one example of distribution of magnitude of a monitoring value.

FIG. 4 is a diagram illustrating one example of the distribution of the magnitude of the monitoring value. The horizontal axis represents the magnitude of the monitoring value, and the vertical axis represents the ratio of data included in the range of each bin of the histogram. In the example of FIG. 4, the monitoring values mostly fall within a range from 3.6 to 4.5, and many of those are around 3.8.

The range determiner 305 determines the interested range based on the distribution of the monitoring value. For example, the range determiner 305 establishes plural division intervals dividing the width of distribution as illustrated in FIG. 4. The division interval may or may not be set as each bin of the histogram. That is, a boundary between the division intervals may be different from a boundary between each bin of the histogram. Further, the length of each division interval does not have to be the same. The range determiner 305 may determine, as the interested range, the division interval among the plural division intervals other than the interval including the maximum value of the distribution. Accordingly, in a case where a large number of almost same monitoring values are included in the monitoring data, a specific value may be prevented from remaining unknown due to such monitoring values.

Further, as described above, the monitoring value fluctuates due to various factors. In a case where the monitoring item is the conveyance time as illustrated in FIG. 2, as the monitoring value is greater, that is, as the processing time is longer, the possibility is considered to be stronger that the state of the monitoring target 1 will change to an abnormal state in the future even if the state of the monitoring target 1 is normal. In this description, a situation in which the possibility is strong that the state of the monitoring target 1 will change to an abnormal state in the future even if the state of the monitoring target 1 is normal will be described as "normality is low", and a situation in which the possibility is weak that the state of the monitoring target 1 will change to an abnormal state in the future when the state of the monitoring target 1 is normal will be described as "normality is high". In other words, as the number of sets of monitoring data with large monitoring values is greater, normality of the monitoring target 1 is considered to be lower. On the other hand, as the number of sets of monitoring data with small monitoring values is greater, the monitoring target 1 is considered to be more normal, that is, normality of the monitoring target 1 is considered to be higher. Thus, in a case where it is desired to perform the state estimation based on the monitoring values with which normality of the monitoring target 1 is considered to be low, the interested range may be shifted from the maximum value of the distribution toward a position in which the monitoring values are large. On the other hand, in a case where it is desired to perform the state estimation based on the monitoring values with which normality of the monitoring target 1 is considered to be high, the interested range may be shifted from the maximum value of the distribution toward a position in which the monitoring values are small. Note that in a case where normality of the monitoring target 1 is considered to be higher as the number of sets of monitoring data with large monitoring values is greater, a shifting direction becomes opposite to the above-described case.

The example of FIG. 4 illustrates an interested range A including the monitoring data with high normality and an interested range B including the monitoring data with low normality. As described above, the range determiner 305 may define the interested range between the division interval in which deviation of the distribution becomes the maximum value (the division interval including a protrusion of the distribution) and the division interval in which the deviation of the distribution drops lower than a predetermined threshold value (the division interval corresponding to a tail of the distribution). Note that as for the interested range, only one of an upper limit value and a lower limit value may be defined.

Further, the range determiner 305 may determine the interested range based on a slope of the distribution. As the slope of the distribution is steeper, a difference in normality of the monitoring data is considered to become larger across a line of the distribution. Thus, the range determiner 305 may determine the division interval including a portion in which the slope of the distribution is steepest as the interested range, for example. Alternatively, the division interval may be determined as the interested range, the division interval neighboring the division interval including the portion in which the slope of the distribution is steepest and being far from the division interval in which the deviation of the distribution becomes the maximum value.

The estimator 306 estimates the state of the monitoring target 1 based on data, the value of which is included in the interested range, in the monitoring data in a designated time period. A method of the state estimation may appropriately be defined. For example, the state may be estimated simply based on the number or ratio of sets of monitoring data having the monitoring value in the interested range. For example, when the number or the ratio of the number to all sets of monitoring data is a first threshold value or smaller, the state may be estimated as "a completely normal state". When the number or the ratio is greater than the first threshold value and equivalent to or smaller than a second threshold value, the state may be estimated as "a normal state with a possibility of trouble". When the number or the ratio is greater than the second threshold value, the state may be estimated as "a normal state with a strong possibility of trouble".

Further, the acquirer 302 may receive the interested range determined by the range determiner 305, acquire the monitoring data related to the interested range from the monitoring data storage 301, cause the shaper 303 to perform smoothing or the like for the data, and then pass the data to the estimator 306. The estimator 306 may input the data to a state estimation model based on a neural network that has already performed learning, for example, and thereby obtain an output of the state estimation model as an estimation result.

The output device 307 outputs processing results by the configuration elements of the information processing apparatus 3 to the input-output apparatus 4. An output format of the output device 307 may be changed in accordance with the input-output apparatus 4. For example, an image summarizing the processing results may be output by the output device 307, or a file describing the processing results may be output.

Figure 5:
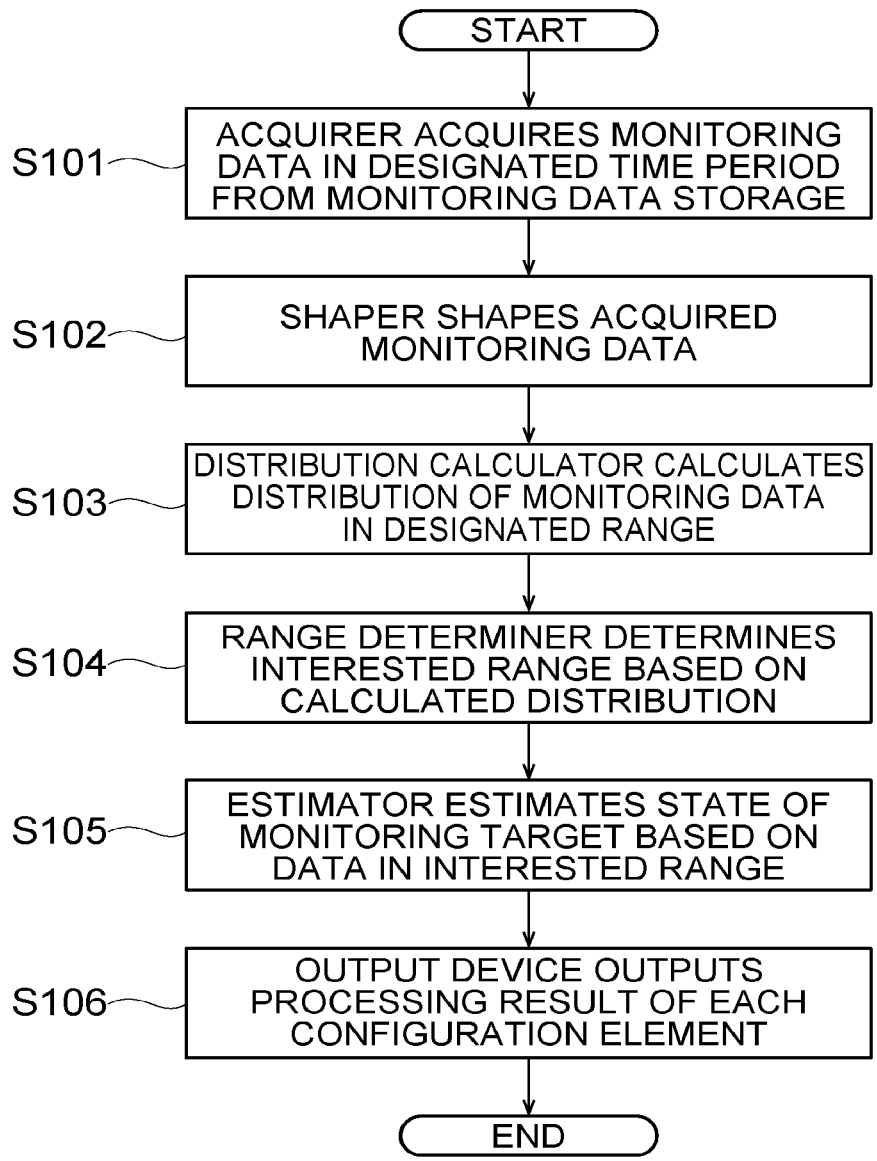
FIG. 5 is an outline flowchart of whole processing by an information processing apparatus according to the first embodiment.

Next, a description will be made about the flow of processes by the configuration elements. FIG. 5 is an outline flowchart of whole processing by the information processing apparatus according to the first embodiment.

The acquirer 302 acquires the monitoring data in a designated time period from the monitoring data storage 301 (S101). The shaper 303 performs smoothing, noise removal, and so forth and thereby shapes the acquired monitoring data (S102). The distribution calculator 304 tallies the monitoring data and calculates distribution such as a histogram (S103).

The range determiner 305 determines the interested range about the value of the acquired monitoring data based on the calculated distribution (S104). The estimator 306 estimates the state of the monitoring target 1 based on the monitoring data the value of which is in the interested range (S105). Note that the acquirer 302 may reacquire, from the monitoring data storage 301, the monitoring data which is the monitoring data in the designated time period and the value of which is in the interested range. In this case also, the shaper 303 may shape newly acquired monitoring data. The output device 307 outputs the processing results by the configuration elements such as the determined interested range and an estimated state (S106), and the flow finishes.

As described above, in a case where the state estimation is performed by using data in the normal state, the information processing apparatus 3 of this embodiment determines the interested range of the data used for the state estimation. The state estimation is performed by using the data included in the interested range, and a peculiar value is thereby prevented from remaining unknown due to deviation of the value indicated by the data in the normal state. Accordingly, in a case where the state estimation is performed by using the data in the normal state, the precision of the state estimation may be enhanced.

Second Embodiment

Figure 6:
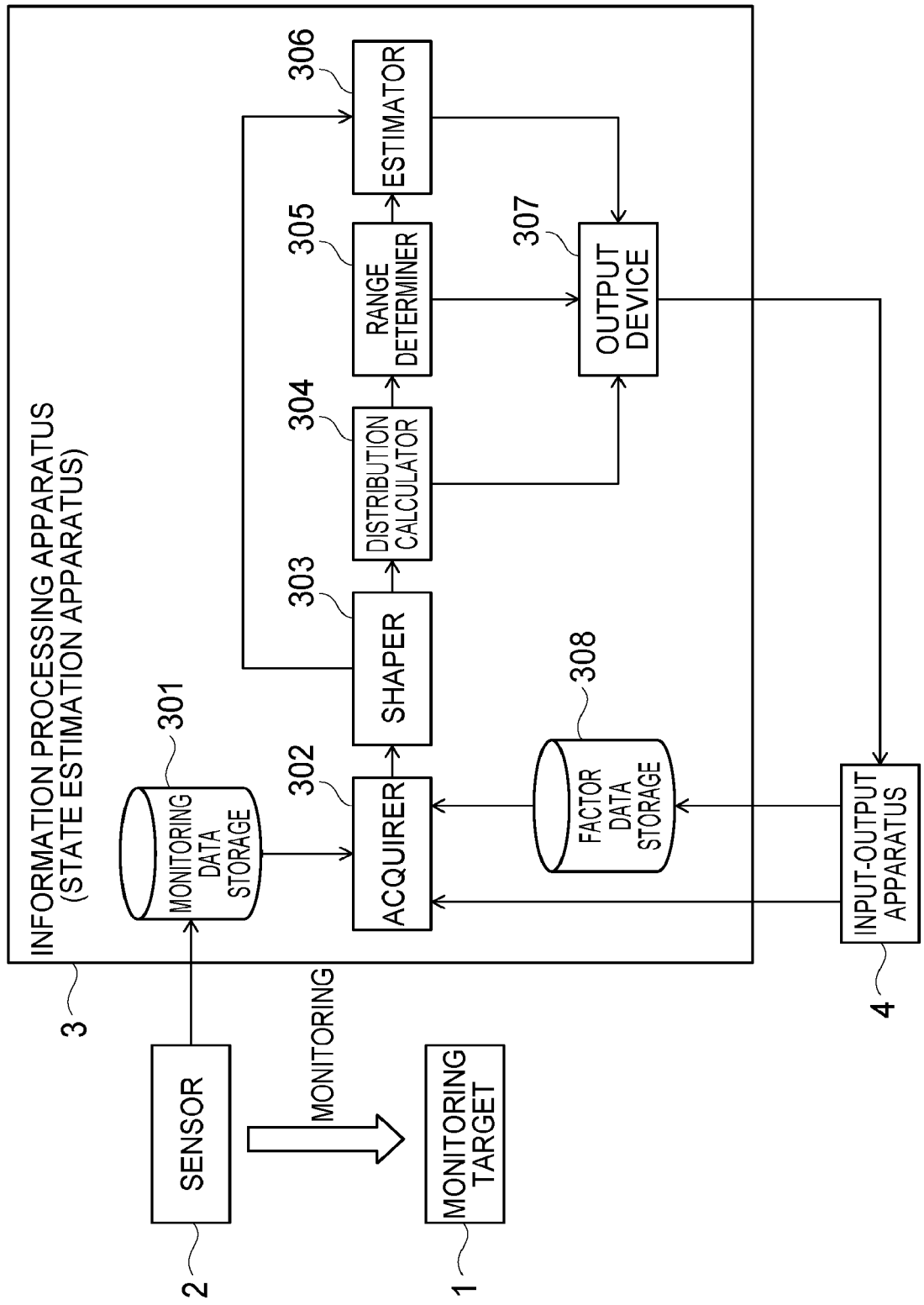
FIG. 6 is a block diagram illustrating one example of a state estimation system according to a second embodiment.

FIG. 6 is a block diagram illustrating one example of a state estimation system according to a second embodiment. In the state estimation system related to the second embodiment, the information processing apparatus 3 further includes a factor data storage 308.

In this embodiment, in a case where a specific event causing the state of the monitoring target 1 to vary occurs in a designated time period when the monitoring data is acquired, the monitoring data before and after the occurrence of the event is utilized. For example, it is considered that when maintenance is performed for equipment as the monitoring target, the state of the monitoring target 1 is improved, the processing speed of the monitoring target 1 is recovered, and the frequency of reprocessing due to failure of processing is decreased. That is, the monitoring data after maintenance is considered to have the monitoring value in a case where normality of the monitoring target 1 is high. Thus, in a case where the interested range is defined so as to include the monitoring value in a case where the normality of the monitoring target 1 is high, the values in a case where normality is high may be collected more when the monitoring data after maintenance is used than when other monitoring data is used. Further, the difference between the monitoring data after maintenance and the monitoring data before maintenance represents the degree of improvement by the maintenance.

As described above, in this embodiment, the state estimation is performed by using the monitoring data before and after occurrence of a predetermined factor causing the state of the monitoring target 1 to vary such as maintenance. Accordingly, the precision of the state estimation is further enhanced. Note that an importance degree is provided, the importance degree of the monitoring data before and after the occurrence of the factor is made higher than the other monitoring data, and the weight of the monitoring data before and after the occurrence of the factor may be made higher with respect to the estimation result. For example, in a case where the state of the monitoring target 1 is estimated from the monitoring data in three unit time periods, the state estimation is performed for each of the unit time periods. The numerical values indicating the estimation results of the unit time periods closer to the time after the maintenance are multiplied by the importance degrees set higher, and a final estimation result may thereby be calculated.

In the following, an event in advance defined and estimated to cause the state of the monitoring target 1 to vary will be denoted as "variation factor". The variation factor may appropriately be defined and may be a factor positively influencing or negatively influencing a target. In other words, the variation factor may raise the monitoring value or may lower the monitoring value. Further, the monitoring item of this embodiment is preferably an item the value of which is likely to vary due to maintenance or the like.

Processing of the second embodiment will be described. Note that description of the same matters as those of the first embodiment will be omitted.

The factor data storage 308 stores data indicating occurrence date and time of the variation factor. The data will be denoted as "factor data (second data)". For example, for recording management of the monitoring target 1, an operation is often performed in which date and time and contents of work conducted for the monitoring target are recorded. Such records may be saved in the factor data storage 308. Alternatively, only the record related to the variation factor among the records may be selected and stored in the factor data storage 308.

The acquirer 302 detects the occurrence date and time of the variation factor in a designated time period from the factor data in the designated time period before acquiring the monitoring data in the designated time period. Then, the acquirer 302 acquires the monitoring data in a designated unit time period at least either before or after occurrence of the variation factor. For example, the unit time period is a unit of one day, it is possible to acquire the monitoring data on the day before or the day after the occurrence of the variation factor. Further, if necessary, the monitoring data in the designated time period may be acquired.

For example, in a case where the variation factor is maintenance, normality of the monitoring target 1 is considered to be low on the day before the maintenance. Thus, in a case where the state is estimated by using the monitoring data in which normality of the monitoring target 1 is considered to be low, it is considered that precision becomes higher than the first embodiment when the monitoring data on the day before the maintenance is further used. Further, the monitoring target 1 is considered to be in a state where normality is high on the day after the maintenance. In a case where the state is estimated by using the monitoring data in which normality of the monitoring target 1 is considered to be high, it is considered that precision becomes higher than the first embodiment when the monitoring data on the day after the maintenance is further used. Thus, the acquirer 302 acquires the monitoring data at least either before or after the occurrence of the variation factor in the designated time period.

The shaper 303 and the distribution calculator 304 process the acquired monitoring data in the same manner as the first embodiment. The range determiner 305 may also determine a range based on the acquired monitoring data in the same manner as the first embodiment.

Further, in a case where the monitoring data with high normality on the day after maintenance or the like is processed, necessity for paying attention to the monitoring data with higher normality in such monitoring data is low. In other words, for the monitoring data with high normality, necessity for shifting the interested range from the average value, the median, or the like is low. Accordingly, in a case where the monitoring data with high normality is processed, the range determiner 305 may calculate the average value or median and the standard deviation from the distribution, set the sum of the average or median and the standard deviation (average or median+standard deviation) as the upper limit value of the interested range, and set the difference between the average or median and the standard deviation (average or median−standard deviation) as the lower limit value of the interested range. Further, a value designated by a user may be taken into consideration for determination of the upper limit value and the lower limit value. Note that a representative value such as an average or a median may be calculated not by the range determiner 305 but by the distribution calculator 304.

Figure 7:
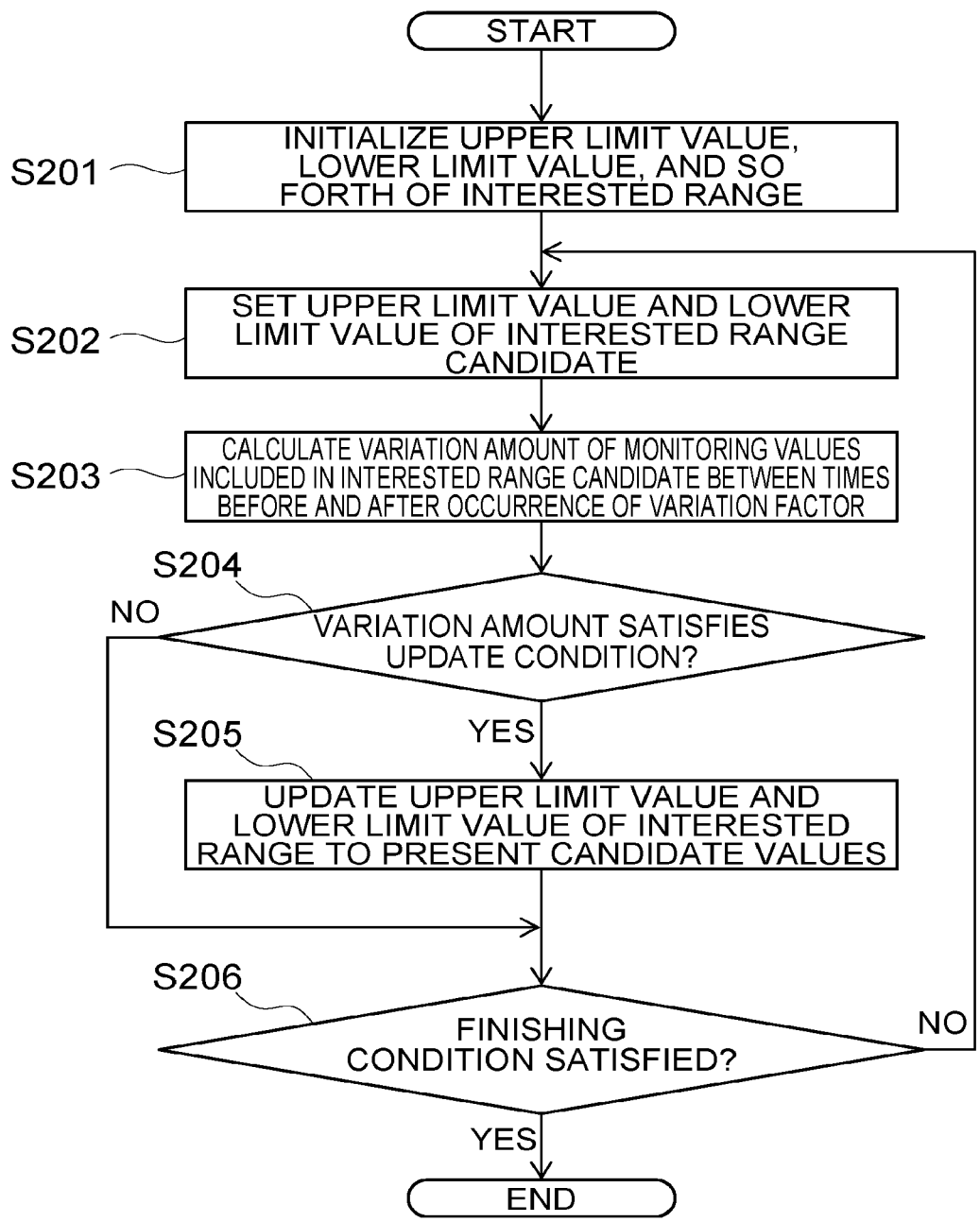
FIG. 7 is a flowchart of processing for determining an interested range based on the distribution before and after occurrence of a variation factor.

Further, the range determiner 305 may determine the interested range based on the distribution before the occurrence of the variation factor or the distribution after the occurrence. FIG. 7 is a flowchart of processing for determining the interested range based on the distribution before and after the occurrence of the variation factor. First, the range determiner 305 initializes the upper limit value and the lower limit value of the interested range (S201). Next, the range determiner 305 sets candidate values of the upper limit value and the lower limit value of the interested range (S202). It is assumed that an interested range candidate is a temporary interested range used for searching for the optimal interested range and is a different thing from the interested range. The candidate values may be defined in advance or determined at random.

Then, the range determiner 305 calculates a difference in the monitoring value included in the interested range candidate between times before and after the occurrence of the variation factor, in other words, a variation amount (S203). That is, the monitoring data included in the interested range candidate in the monitoring data before the occurrence of the variation factor is compared with the monitoring data included in the interested range candidate in the monitoring data after the occurrence of the variation factor. For example, comparison may be performed between the numbers, ratios, or the like of monitoring values included in the interested range candidates before and after the occurrence.

For example, each bin of a histogram as illustrated in FIG. 4 is used as the interested range candidate, and the variation amount between the height before the occurrence of the variation factor and the height after the occurrence of the variation factor may be used for comparison. Alternatively, the variation amount may be calculated by using a predetermined calculation formula. For example, the result of subtraction of the average value of values included in the interested range candidate before the occurrence of the variation factor from the average value of values included in the interested range candidate after the occurrence of the variation factor may be set as the variation amount. Alternatively, the standard deviation may be taken into consideration while fluctuations in data are taken into consideration. For example, the variation amount may be calculated by a calculation formula such as (the average value of values after the occurrence of the variation factor−the average value of values before the occurrence of the variation factor)/(the standard deviation of values after the occurrence of the variation factor+the standard deviation of values before the occurrence of the variation factor).

In a case where the calculated variation amount satisfies an update condition (YES in S204), the upper limit value and the lower limit value of the interested range are updated to values of a present interested range candidate (S205). In a case where calculated variation amount does not satisfy the update condition (NO in S204), the update is not performed. Then, it is checked whether a finishing condition is satisfied, and in a case where the finishing condition is not satisfied (NO in S206), the flow returns to a process of S202. That is, processing for the next interested range candidate is performed. In such a manner, until the finishing condition is satisfied, investigations about different interested range candidates are performed, the upper limit value and the lower limit value of the interested range are updated. Then, in a case where the finishing condition is satisfied (YES in S206), the flow is finished, and the upper limit value and the lower limit value of the interested range are fixed.

The update condition is considered to be based on whether the variation amount is the maximum so far; however, a conditional expression or the like may be used, and the update condition may appropriately be defined. The finishing condition may be a common finishing condition in such a search procedure such as whether or not the processing is performed for all candidate values or the count of the processing.

Further, the variation factor may regularly occur. Thus, plural variation factors may occur in the designated time period. In such a case, one of the plural variation factors is selected, and the interested range may be determined based on the monitoring data after occurrence of the selected variation factor. Alternatively, plural variation factors are selected, the monitoring data after occurrence of the selected variation factors is taken into consideration, and the interested range may be determined based on each set of the monitoring data. Further, different kinds of variation factors may occur in the designated time period. In this case, the variation factors do not have to be distinguished, and estimation may be performed for each of the variation factors. Further, a final estimation result may be calculated based on an estimation result about each of the variation factors.

Figure 8:
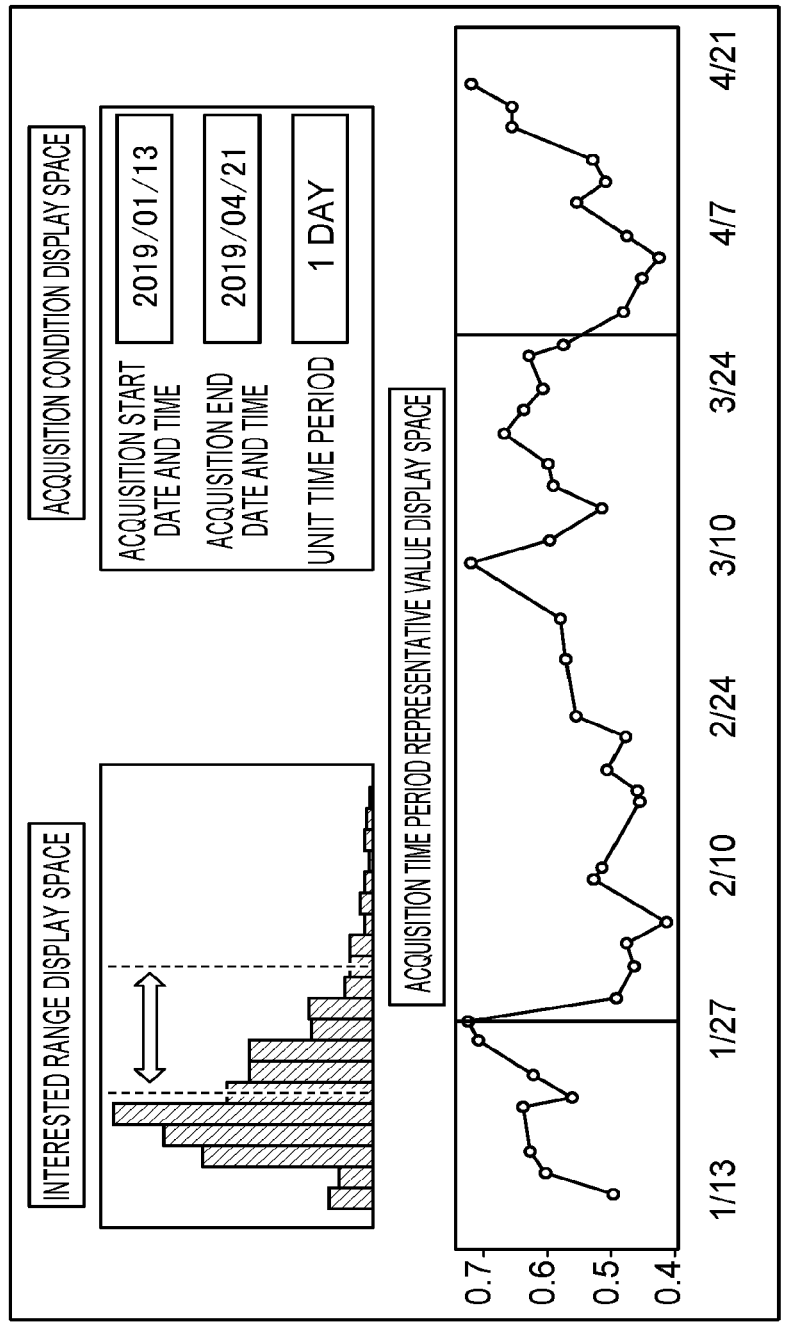
FIG. 8 is a diagram illustrating one example of an output result.

The estimator 306 and the output device 307 may be the same as the first embodiment. FIG. 8 is a diagram illustrating one example of an output result. In the example of FIG. 8, a web page browsable by a web browser is generated and output by the output device 307. Note that although the web page is described in the second embodiment for convenience of description, a web page as illustrated in FIG. 8 may be capable of being output in the first embodiment.

An acquisition condition display space illustrated in FIG. 8 indicates acquisition start date and time and acquisition end date and time that indicate a time period of the monitoring data acquired by the acquirer 302. Further, the unit time period used in calculation of distribution by the distribution calculator 304 is indicated. Note that the acquisition condition display space may be generated by an input form on the web page and may be made capable of acquiring an input from the user. That is, a condition necessary for processing may be input to the information processing apparatus 3 via such a web page.

An acquisition time period representative value display space illustrated in FIG. 8 displays a graph representing a representative value in each unit time period in the time period from the acquisition start date and time to the acquisition end date and time, the time period being indicated in the acquisition condition display space. The example of FIG. 8 uses a ratio as the representative value and indicates that the monitoring data included in the interested range on January 27th, for example, is 70% of the total number of sets of monitoring data on January 27th. Further, two solid lines indicated in the acquisition time period representative value display space and being parallel with the vertical axis indicate the occurrence dates of variation factors.

An interested range display space illustrated in FIG. 8 indicates the interested range. The example in FIG. 8 displays dotted lines indicating the upper limit value and the lower limit value of the interested range determined by the range determiner 305 and an arrow indicating that a portion between the dotted lines is the interested range on an image, as a background, based on a histogram calculated by the distribution calculator 304. For example, the interested range on the day before or on the day after the occurrence of the variation factor indicated in the acquisition time period representative value display space may be indicated.

Various kinds of information other than those, for example, the state estimated based on the monitoring value in the interested range displayed in the interested range display space, the name of the monitoring target 1, and so forth may be displayed.

As described above, the information processing apparatus 3 of this embodiment further narrows down the range of data used preferentially in data used for the state estimation based on occurrence date and time of a factor causing a state of a target to vary. Accordingly, the precision of the estimation may be enhanced.

Note that at least a portion of the above embodiments may be realized by a dedicated electronic circuit (that is, hardware) such as an integrated circuit (IC) in which a processor, a memory, and so forth are implemented. Further, at least a portion of the above embodiments may be realized by executing software (program). For example, a general purpose computer apparatus is used as a basic hardware, a processor such as a CPU mounted on the computer apparatus is caused to execute a program, and the processing of the above embodiments may thereby be realized.

For example, a computer reads out dedicated software stored in a computer-readable storage medium, and the computer may thereby be used as an apparatus of the above embodiments. Kinds of storage media are not particularly limited. For example, the computer installs dedicated software downloaded via a communication network, and the computer may thereby be used as an apparatus of the above embodiments. Accordingly, information processing by software is specifically implemented by using a hardware resource.

Figure 9:
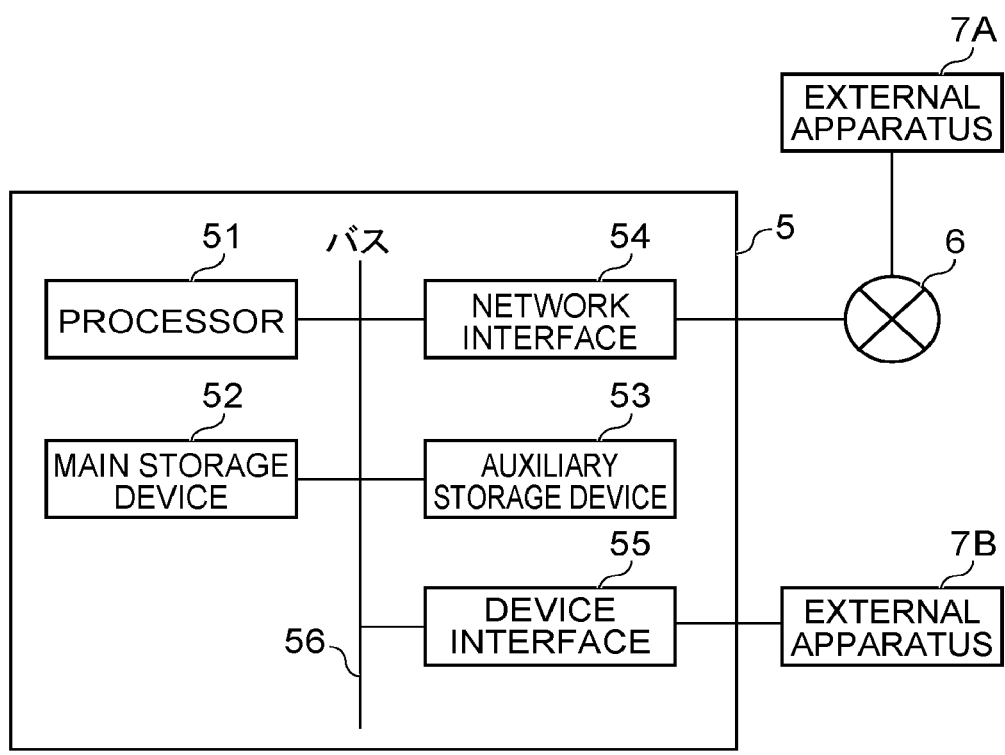
FIG. 9 is a block diagram illustrating one example of a hardware configuration in one embodiment of the present invention.

FIG. 9 is a block diagram illustrating one example of a hardware configuration of one embodiment of the present invention. The information processing apparatus 3 includes a processor 51, a MAIN STORAGE DEVICE 52, an AUXILIARY STORAGE DEVICE 53, a network interface 54, and a device interface 55 and is realized as a computer apparatus 5 in which those are connected together via a bus 56. The monitoring data storage 301 and the factor data storage 308 are realizable by the MAIN STORAGE DEVICE 52 or the AUXILIARY STORAGE DEVICE 53, and the other configuration elements are realizable by the processor 51.

Note that the computer apparatus 5 in FIG. 9 includes one configuration element for each configuration element but may include the plural same configuration elements. Further, although FIG. 9 illustrates one computer apparatus 5, software is installed in plural computer apparatuses, and each of the plural computer apparatuses may execute a different portion of processing of the software.

The processor 51 is an electronic circuit including a control apparatus and a computation apparatus of the computer. The processor 51 performs computation processing based on data or a program input from each apparatus or the like of an internal configuration of the computer apparatus 5 and outputs a computation result or a control signal to each apparatus or the like. Specifically, the processor 51 executes an operating system (OS) of the computer apparatus 5, an application, and so forth and controls each apparatus configuring the computer apparatus 5. The processor 51 is not particularly limited as long as the processor 51 may perform the above processing.

The MAIN STORAGE DEVICE 52 is a storage storing commands executed by the processor 51, various kinds of data, and so forth, and information stored in the MAIN STORAGE DEVICE 52 is directly read out by the processor 51. The AUXILIARY STORAGE DEVICE 53 is a storage other than the MAIN STORAGE DEVICE 52. Note that it is assumed that those storages mean arbitrary electronic components capable of storing electronic information and may be a memory or a storage. Further, a memory may be categorized into a volatile memory and a non-volatile memory, but either one may be used.

The network interface 54 is an interface for connection with the communication network 6 in a wireless or wired manner. Any network interface may be used as the network interface 54 as long as it conforms to an existing communication standard. The network interface 54 may exchange information with an external apparatus 7A with which communication connection is made via the communication network 6.

The device interface 55 is an interface such as a USB directly connected with an external apparatus 7B. The external apparatus 7B may be an external storage medium or a storage apparatus such as a database.

The external apparatuses 7A and 7B may be output apparatuses. The output apparatus may be a display apparatus for displaying an image or may be an apparatus or the like outputting sound or the like, for example. Examples may include a liquid crystal display (LCD), a cathode ray tube (CRT), a plasma display panel (PDP), a speaker, and so forth but are not limited to those.

The external apparatuses 7A and 7B may be input apparatuses. The input apparatus includes devices such as a keyboard, a mouse, and a touch panel and provides information input by those devices to the computer apparatus 5. A signal from the input apparatus is output to the processor 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A system for estimating a state of a monitoring target, the system comprising:
   a sensor that measures an operation of the monitoring target; and
   an information processing apparatus including:
      acquisition circuitry configured to acquire first data from the sensor; and
      processing circuitry configured to:
         calculate a distribution representing a magnitude of a value and a frequency of the magnitude of the value based on the first data acquired by the acquisition circuitry;
         divide a width of the distribution into a plurality of division intervals;
         detect a first division interval in which a deviation of the distribution becomes a maximum value among the plurality of division intervals and a second division interval in which the deviation of the distribution is less than a predetermined value among the plurality of division intervals;
         determine one or more division intervals existing between the first division interval and the second division interval as a specific range used for estimating the state of the monitoring target;
         estimate the state of the monitoring target based on a number or a ratio of the number of the first data whose values are within the specific range among values of the first data acquired by the acquisition circuitry, or input the first data whose values are within the specific range into a state estimation model based on a learned neural network and obtain an output of the state estimation model as an estimation result of the state of the monitoring target; and
         with respect to the state:
            when the number or the ratio is a first threshold value or smaller, determine a completely normal state,
            when the number or the ratio is greater than the first threshold value and equivalent to or smaller than a second threshold value, determine a normal state with a possibility of trouble, and
            when the number or the ratio is greater than the second threshold value, determine a normal state with a strong possibility of trouble.

2. The system according to claim 1, wherein the processing circuitry is configured to determine, as the specific range, a third division interval including a steepest slope of the distribution or a fourth division interval which is adjacent to the third division interval and which is farther from a maximum value of the magnitude of the distribution among the plurality of division intervals.

3. The system according to claim 1, wherein
   the acquisition circuitry is configured to acquire second data indicating an occurrence time of a variation factor of the value, and
   the processing circuitry is configured to:
      calculate a first distribution representing a relationship between:
         magnitudes of values included in the first data acquired during a unit time period including the occurrence time, and
         frequencies of the magnitudes of the values; and
      determine the specific range based on the first distribution.

4. The system according to claim 1, wherein
   the acquisition circuitry is configured to acquire second data indicating an occurrence time of a variation factor of the value, and
   the processing circuitry is configured to:
      calculate a first distribution representing a relationship between:
         a magnitude of a value included in the first data acquired during a first unit time period including the occurrence time, and
         a frequency of the magnitude of the value;
      calculate a second distribution representing a relationship between:
         a magnitude of a value included in the first data acquired during a second unit time period neighboring the first unit time period, and
         a frequency of the magnitude of the value; and
      determine the specific range based on a difference between the first distribution and the second distribution.

5. The system according to claim 4, wherein the processing circuitry is configured to determine a division interval including a portion in which an amount of variation between the first distribution and the second distribution is greatest as the specific range.

6. The system according to claim 4, wherein, in a case where a plurality of occurrence times of the variation factor are present, the specific range with a largest corresponding variation amount is selected among specific ranges determined for respective occurrence times.

7. The system according to claim 1, wherein the processing circuitry is configured to:
   assess whether the value included in the first data is an outlier; and
   remove the value assessed as the outlier from the first data.

8. The system according to claim 1, wherein the processing circuitry is configured to perform smoothing of at least data of the first data, the data having a value included in the specific range.

9. The system according to claim 1, further comprising output circuitry configured to output at least one of the distribution and the specific range.

10. The system according to claim 1, wherein
the monitoring target is an automatic ticket gate,
the monitoring target is a mail sorter, or
the monitoring target is a bill validator.

11. The system according to claim 1, wherein the first division interval is a division interval including a protrusion of the distribution and the second division interval is a division interval including a tail of the distribution.

12. An information processing method for estimating a state of a monitoring target, the method comprising:
  acquiring first data from a sensor measuring an operation of the monitoring target;
  calculating a distribution representing a magnitude of a value and a frequency of the magnitude of the value based on the first data acquired;
  dividing a width of the distribution into a plurality of division intervals;
  detecting a first division interval in which a deviation of the distribution becomes a maximum value among the plurality of division intervals and a second division interval in which the deviation of the distribution is less than a predetermined value among the plurality of division intervals;
  determining one or more division intervals existing between the first division interval and the second division interval as a specific range used for estimating the state of the monitoring target;
  estimating the state of the monitoring target based on a number or a ratio the number of the first data whose values are within the specific range among values of the first data acquired, or inputting the first data whose values are within the specific range into a state estimation model based on a learned neural network and obtaining an output of the state estimation model as an estimation result of the state of the monitoring target; and
  with respect to the state:
    when the number or the ratio is a first threshold value or smaller, determining a completely normal state,
    when the number or the ratio is greater than the first threshold value and equivalent to or smaller than a second threshold value, determining a normal state with a possibility of trouble, and
    when the number or the ratio is greater than the second threshold value, determining a normal state with a strong possibility of trouble.

13. A non-transitory computer readable medium storing a program, which when executed by a computer causes the computer to perform a method for estimating a state of a monitoring target, the method comprising:
  acquiring first data from a sensor measuring an operation of the monitoring target;
  calculating a distribution representing a magnitude of a value and a frequency of the magnitude of the value based on the first data acquired;
  dividing a width of the distribution into a plurality of division intervals;
  detecting a first division interval in which a deviation of the distribution becomes a maximum value among the plurality of division intervals and a second division interval in the deviation of the distribution is less than a predetermined value among the plurality of division intervals;
  determining one or more division intervals existing between the first division interval and the second division interval as a specific range used for estimating the state of the monitoring target;
  estimating the state of the monitoring target based on a number or a ratio of the number of the first data whose values are within the specific range among values of the first data acquired, or inputting the first data whose values are within the specific range into a state estimation model based on a learned neural network and obtaining an output of the state estimation model as an estimation result of the state of the monitoring target and
  with respect to the state:
    when the number or the ratio is a first threshold value or smaller, determining a completely normal state,
    when the number or the ratio is greater than the first threshold value and equivalent to or smaller than a second threshold value, determining a normal state with a possibility of trouble, and
    when the number or the ratio is greater than the second threshold value, determining a normal state with a strong possibility of trouble.

\* \* \* \* \*